US010962237B2

(12) United States Patent
Stepa et al.

(10) Patent No.: US 10,962,237 B2
(45) Date of Patent: Mar. 30, 2021

(54) SYSTEM, APPARATUS AND METHOD FOR EFFICIENT USE OF SOLAR PHOTOVOLTAIC ENERGY

(71) Applicant: Rheem Australia Pty Limited, Rydalmere (AU)

(72) Inventors: Grant Stepa, Rydalmere (AU); Peter Kerr, Rydalmere (AU)

(73) Assignee: Rheem Australia Pty Limited, Rydalmere (AU)

( * ) Notice: Subject to any disclaimer, the term of this patent is extended or adjusted under 35 U.S.C. 154(b) by 28 days.

(21) Appl. No.: 16/344,768

(22) PCT Filed: Oct. 4, 2017

(86) PCT No.: PCT/AU2017/051081
§ 371 (c)(1),
(2) Date: Apr. 24, 2019

(87) PCT Pub. No.: WO2018/076044
PCT Pub. Date: May 3, 2018

(65) Prior Publication Data
US 2019/0334350 A1    Oct. 31, 2019

(30) Foreign Application Priority Data

Oct. 28, 2016   (AU) .................................. 2016250449

(51) Int. Cl.
*F24D 19/10*    (2006.01)
*H02S 40/44*    (2014.01)
(Continued)

(52) U.S. Cl.
CPC ......... *F24D 19/1057* (2013.01); *F24H 1/185* (2013.01); *H02J 3/383* (2013.01);
(Continued)

(58) Field of Classification Search
CPC . H02J 2300/24; H02J 2310/14; H02J 2310/12
(Continued)

(56) References Cited

U.S. PATENT DOCUMENTS 199,625 A       4/1935  Pendleton
10,072,853 B2 * 9/2018  Chaudhry ............... F24H 1/202
(Continued)

FOREIGN PATENT DOCUMENTS

DE    202012102677    8/2012
EP    2469238         6/2012
(Continued)

OTHER PUBLICATIONS

Supplemental European Search Report for European Patent Application No. 17865807.6 dated Mar. 19, 2020.
(Continued)

*Primary Examiner* — Michael R. Fin
(74) *Attorney, Agent, or Firm* — Troutman Pepper Hamilton Sanders LLP

(57) ABSTRACT

A solar photovoltaic (PV) water heating system includes a tank including at least a first heating unit having at least first and second heating elements, at least one of which is switchable; a PV solar collector; an inverter adapted to convert the output from the PV collector to an alternating power supply; a modulator to modulate the alternating power supply from the inverter; a controller adapted to control the modulator and the switching of the or each switchable heating element; wherein the controller is adapted to control the modulator and the switchable heating elements to maximize the energy drawn from the PV collector.

17 Claims, 12 Drawing Sheets

(51) Int. Cl.
*F24D 17/00* (2006.01)
*F24H 1/18* (2006.01)
*H02S 10/20* (2014.01)
*H02J 3/38* (2006.01)
*H02S 40/32* (2014.01)
*G05F 1/67* (2006.01)
*H02S 50/00* (2014.01)
*H02S 40/38* (2014.01)
*H02J 7/35* (2006.01)

(52) U.S. Cl.
CPC ............. *H02J 3/385* (2013.01); *H02S 10/20* (2014.12); *H02S 40/32* (2014.12); *H02S 40/44* (2014.12); *F24D 17/0068* (2013.01); *F24D 2200/02* (2013.01); *F24D 2200/08* (2013.01); *F24D 2200/14* (2013.01); *F24D 2200/32* (2013.01); *G05F 1/67* (2013.01); *H02J 7/35* (2013.01); *H02S 40/38* (2014.12); *H02S 50/00* (2013.01)

(58) Field of Classification Search
USPC .............................................. 307/12, 31, 19
See application file for complete search history.

(56) References Cited

U.S. PATENT DOCUMENTS

| | | | |
|---|---|---|---|
| 2010/0235008 A1* | 9/2010 | Forbes, Jr. | B60L 53/14 700/291 |
| 2012/0060829 A1* | 3/2012 | Duplessis | F24D 19/1042 126/609 |
| 2012/0078433 A1* | 3/2012 | Honma | H01M 8/1011 700/295 |
| 2013/0263843 A1 | 10/2013 | Kreutzman | |
| 2014/0088780 A1* | 3/2014 | Chen | H02J 13/00017 700/295 |
| 2014/0348493 A1 | 11/2014 | Kreutzman | |
| 2015/0214738 A1 | 7/2015 | Covic et al. | |
| 2015/0326012 A1 | 11/2015 | Tsuchiya | |
| 2016/0178239 A1* | 6/2016 | Thornton | F24H 1/185 700/295 |
| 2016/0329713 A1* | 11/2016 | Berard | H02J 3/386 |
| 2018/0069403 A1* | 3/2018 | Shuy | G05F 1/67 |

FOREIGN PATENT DOCUMENTS

| | | |
|---|---|---|
| EP | 2485189 A1 | 8/2012 |
| EP | 2610999 | 7/2013 |
| GB | 2534676 A | 8/2016 |
| GB | 2539369 | 12/2016 |

OTHER PUBLICATIONS

International search report for PCT/AU2017/051081, dated Jan. 19, 2018.

* cited by examiner

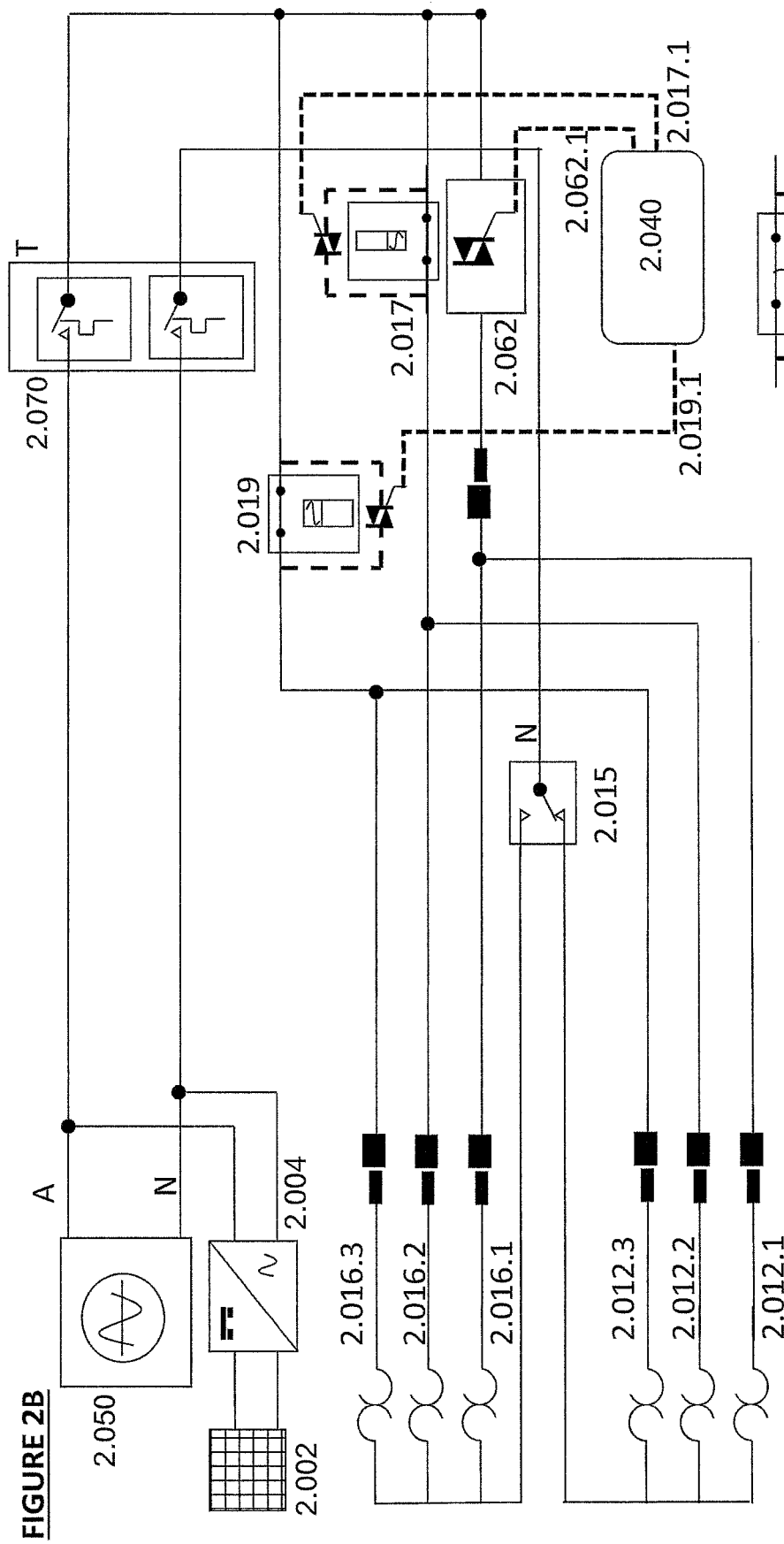

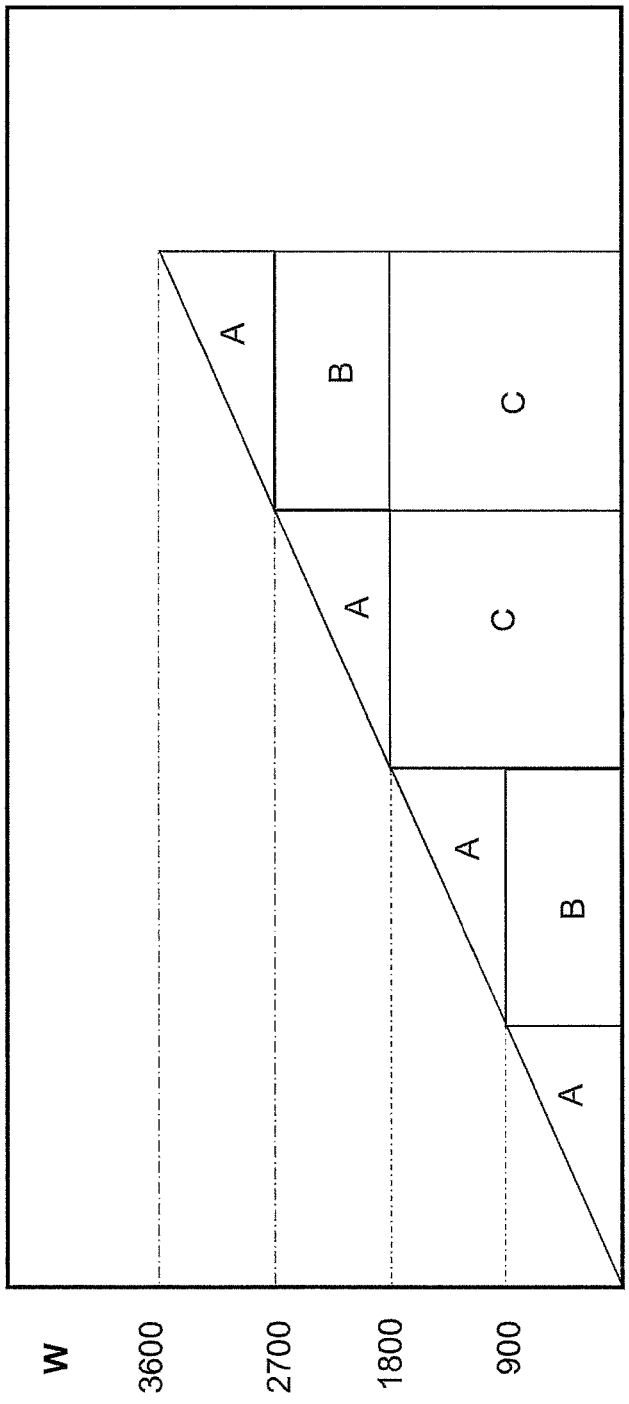

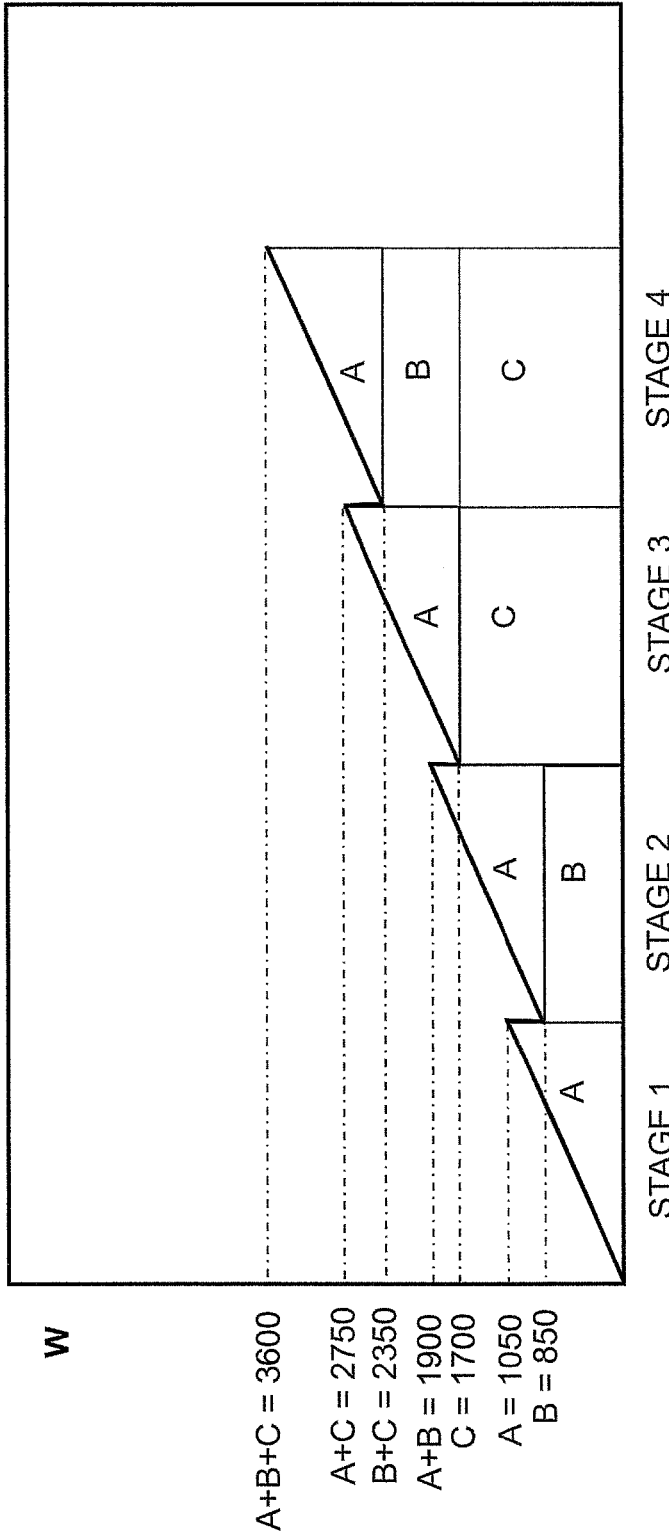

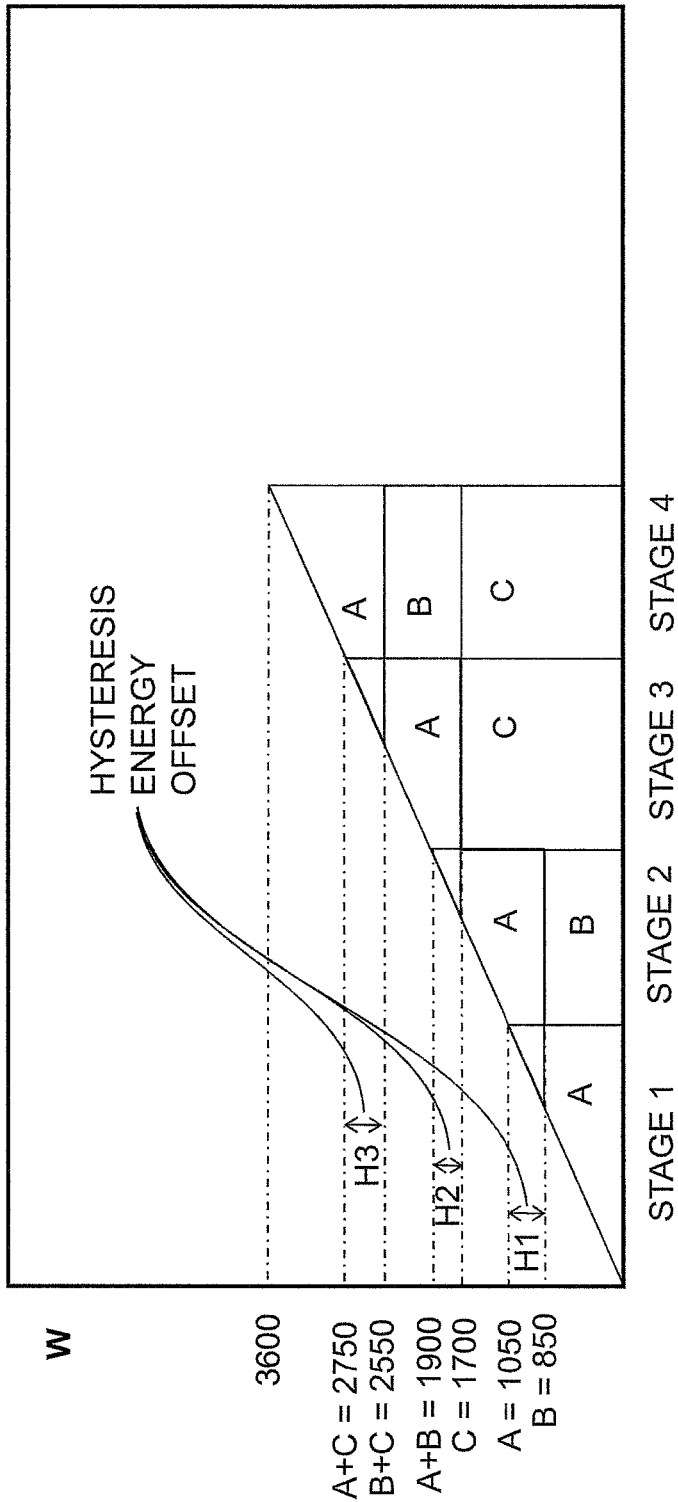

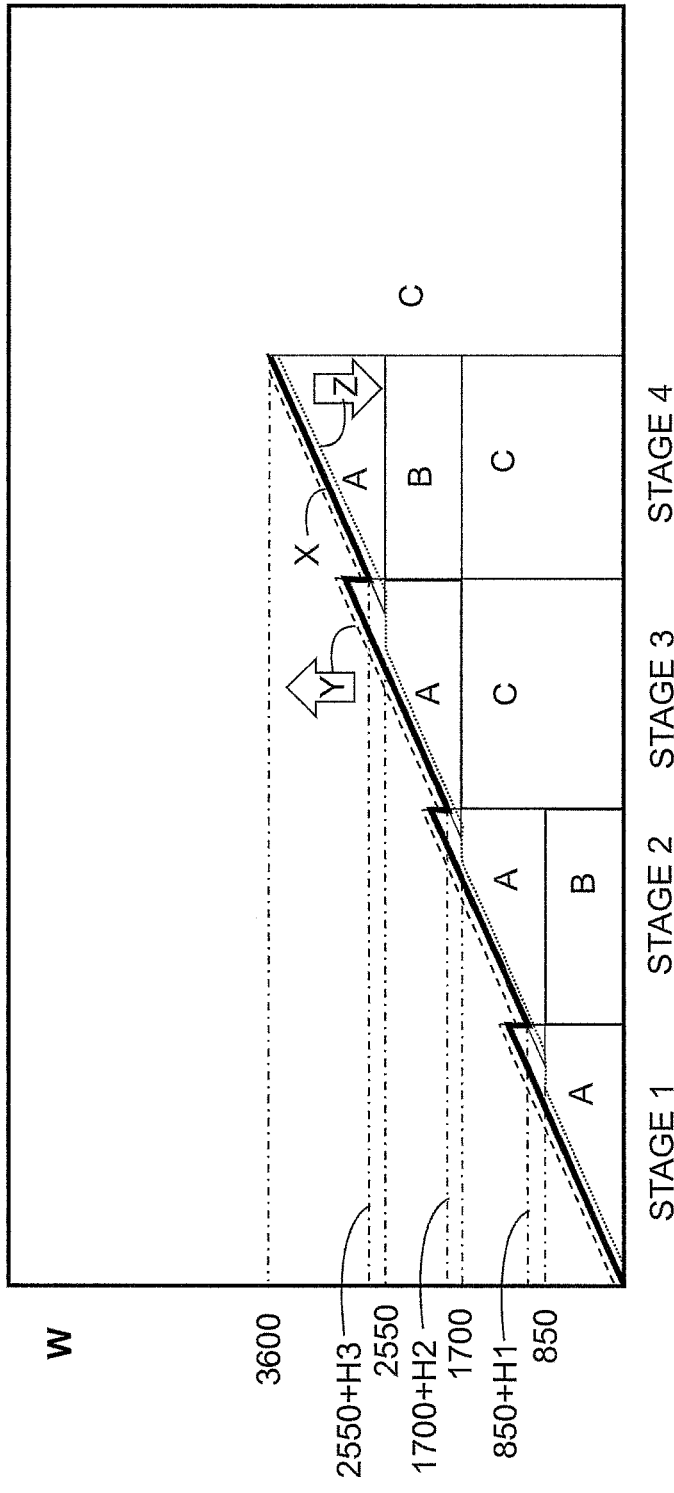

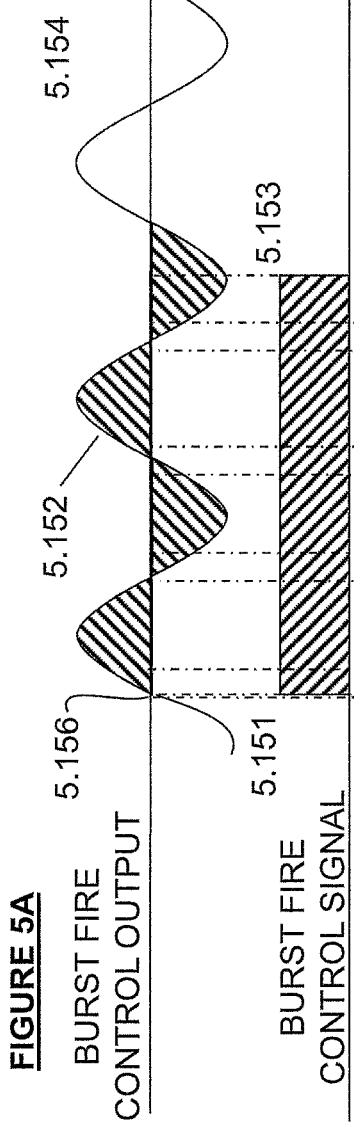

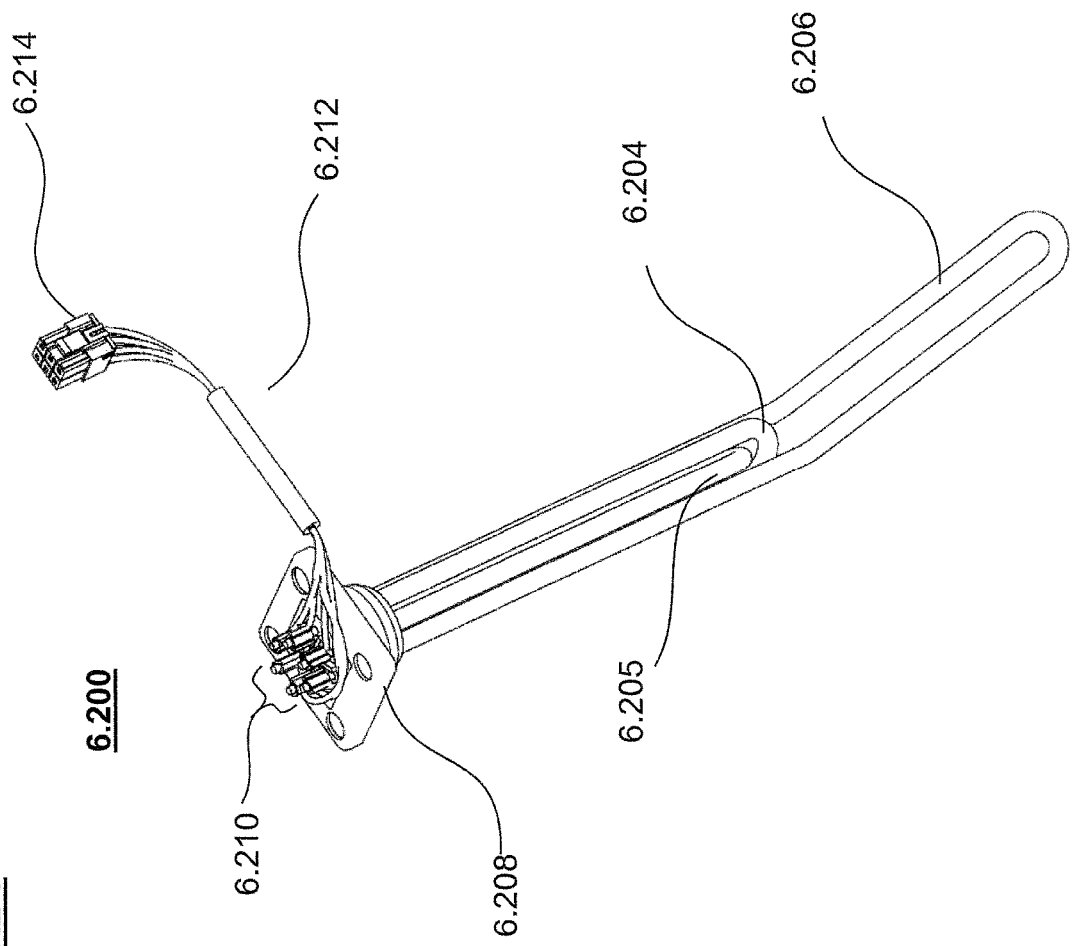

SYSTEM, APPARATUS AND METHOD FOR EFFICIENT USE OF SOLAR PHOTOVOLTAIC ENERGY

RELATED APPLICATIONS

The present application is a national phase application of and claims priority to PCT Patent Application No. PCT/AU2017/051081, filed Oct. 4, 2017, which claims priority to Australian Patent Application No. 2016250449 filed Oct. 28, 2016. The entire contents of the foregoing applications are hereby incorporated herein by reference.

BACKGROUND

This invention relates to the utilization of renewable energy. The sources of some forms of renewable energy, such as solar and wind, have a highly variable output. For example, solar collector output varies with the amount of insolation impinging on the collector, and this varies gradually with the position of the sun and rapidly with the passing of clouds. Similarly, wind generators are subject to wind fluctuations. While the invention is applicable to the different forms of renewable energy, the invention will be described primarily in the context of a solar photovoltaic energy system.

With the adoption of smart electricity meters, power companies can charge different tariffs during periods of the day according to the load on the power generator equipment.

There are many ways of using solar energy and the invention will be described in the context of a solar electric storage water heater. Solar thermal water heating systems heat a heat transfer fluid and use this to heat water in a storage tank. Solar photovoltaic (PV) water heating systems convert solar energy to electric energy and use the electrical energy to heat a resistive heating unit in the tank. Water heating consumes about a quarter of a typical household's electricity usage for households equipped with electric water heaters. Water heating also makes up a significant portion of gas consumption for households with gas water heating. Solar energy is tariff free.

Solar thermal water heaters have a disadvantage in relation to solar electric water heaters in that, at low levels of insolation, if there is insufficient solar input to heat the heat transfer fluid above the temperature of the water in the tank, no useful energy can be collected. On the other hand, as long as there is sufficient solar input to a solar photovoltaic (PV) collector to generate electrical output, the heating unit can still deliver heat to the water in the tank due to the higher exergy value of the PV energy, the thermal system having no useable energy when the temperature of the heat transfer fluid is not hotter than the water in the tank.

There are many roof top PV systems installed in Australia. These systems were popularised due to a generous feed in tariff that enabled their owners to receive a reasonable payback for their investment. Some solar PV systems were designed to maximize the benefit of the feed in tariff and delivered the PV power to the utility grid system. However, home owners with PV collectors may wish to use the PV energy to replace some or all of their utility grid power consumption. As water heating is a significant portion of household consumption, this invention proposes a system and method to utilize solar PV to supply a water heater.

One problem with solar energy is that it can be subject to random fluctuations especially on partially cloudy days.

Typically, electric storage water heaters have a single heating unit.

WO2014089215 describes a method of using DC from the solar collector to power the heating unit. A disadvantage of DC is that it is difficult to interrupt a DC current, and connector contacts can be eroded by sparks on switching the current off.

U.S. Pat. No. 5,293,447 (1994) describes a means for improving efficiency by measuring the incoming solar energy intensity and switching the resistance to approximate the maximum power point (MPP) at low levels of insolation. The heating unit is driven by DC from the PV collector. The system requires a separate heating unit for use with utility grid power.

Modulation of the current supplied to heating units is known. However, it has the problem that modulation systems may generate unacceptable amounts of electromagnetic interference or cause fluctuations in the power system.

It is desirable to provide an efficient means of delivering energy from the solar photovoltaic collector to the heating unit assembly of a water heater tank which mitigates or resolves one or more of these problems.

It is desirable to provide a means to facilitate internal consumption of PV energy or for adapting existing systems to this end.

It is also desirable to provide an effective means of adding heat to water in a water heater tank.

It is also desirable to devise a heating assembly which can be adapted to operate with existing water heater tanks.

SUMMARY OF THE INVENTION

According to an embodiment of the invention, there is provided a control system for a variable energy source utility grid feed-in system having at least a first energy consuming component having a first supply priority, and a second energy consuming component having a second energy supply priority, the first energy supply priority being greater than the second energy supply priority, the controller receiving current flow information identifying current inflow from the utility grid or current flow to the utility grid, the controller being adapted to control the flow of energy to the second energy consuming component, the controller being adapted to control the deliver of energy from the variable energy source in order of priority to the first energy consuming component, the second energy consuming component, and the utility grid feed-in.

The control system can include a status monitoring means adapted to monitor a condition of the second energy consuming component for use in regulating the flow of energy to the second energy consuming component.

The status monitoring means can include at least one of a thermostat or a temperature sensor.

The status monitoring means can include a battery charge monitor.

According to an embodiment of the invention, there is provided a first controller for a variable energy source utility grid feed-in system having a first energy consuming component having a first supply priority, and at least a second energy consuming component having a second energy supply priority, the first energy supply priority being greater than the second energy supply priority, the controller receiving status information from the energy storage component, the controller receiving current flow information identifying current inflow from the utility grid or current flow to the utility grid, the energy storage component having a controllable load controlled by the controller, the controller being adapted to control the controllable load to prioritize deliver energy from the variable energy source in order to the first energy consuming component, the second energy consuming component, and the utility grid feed-in.

The second energy consuming component can be a water heater.

The status information can be temperature information.

The controllable load can include a modulator adapted to modulate the variable energy source, and at least a first and a second heating element, wherein the modulator modulates the delivery of energy to the first heating element under the control of the controller.

At least the second heating element is switchable.

All heating elements can be switchable.

According to an embodiment of the invention there is provided a water heating system having:
a water storage tank having:
a temperature sensor;
a heating unit having at least first and second heating elements at least one of which is switchable;
a controller adapted to receive temperature information from the temperature sensor and current flow direction information from a current sensor sensing the inflow or outflow of utility grid current;
a modulator adapted to modulate the flow of energy from a variable energy source to at least the first heating element under the control of the controller;
wherein at least the second heating element is switchable under the control of the controller;
the controller being adapted to control the modulator and the switching of the or each switchable heating element to prioritize delivery of energy from the variable energy source to internal consumption systems before utility grid feed-in.

All the heating elements except the first heating element can be switchable under the control of the controller.

Alternatively, all the heating elements can be switchable under the control of the controller.

The impedance of the heating elements of a heating unit can be R, R/1, R/2 ... R/(N−1), where R is the resistance of the first heating element, and N is the number of heating elements in the heating unit.

such that each successive heating element draws the same amount of power as the power drawn by the sum of the preceding heating elements.

The variable energy source can be a photovoltaic (PV) energy source.

According to an embodiment of the invention, there is provided a variable energy supply system adapted to provide utility grid feed-in, the variable energy supply system including one or more consumption components, one of which is a water heating system, the variable energy supply system including:
a variable energy source;
an energy converter to convert the output from the variable source to an alternating energy supply equivalent to an alternating utility grid supply;
wherein the water heating system includes a water heater tank including at least at least first and second heating elements, at least one of which is switchable;
a modulator to modulate the alternating energy supply from the inverter;
a controller adapted to control the modulator and the switching of the or each switchable heating element to prioritize delivery of energy from the variable energy source to internal consumption systems before utility grid feed-in.

The system can include a bidirectional utility grid current sensor adapted to indicate to the controller the direction of energy flow to or from the utility grid, wherein the controller increases the energy to the heating elements until all the energy from the variable energy source is consumed by the internal consumption systems or until energy is drawn from the utility grid.

A heating unit can have N heating elements, a first element can have an power rating of $V^2/R1$, a second heating element can have power rating of $V^2/R1$, and the remaining elements can have power ratings increasing by $V^2/R1$ to a power rating of $(N-1)*V^2/R1$. The heating elements can be connected in parallel.

The or each heating unit can include first, second and third heating elements, wherein the first element is modulated, the modulated element having a first power rating of $V^2/R1$, the second element has a second power rating of $V^2/R1$, and the third element has an power rating of $2*V^2/R1$.

Each heating element of the first heating unit can be switchable.

The variable energy source can be a solar photovoltaic (PV) energy supply system including a first temperature sensor adapted to measure the temperature of water in the tank and to communicate the temperature measurement to the controller, the controller being adapted to switch off the delivery of energy to the tank when the temperature of the water exceeds a threshold value.

The solar photovoltaic (PV) energy supply system can include a battery chargeable by the PV collector, the controller being adapted to switch PV energy from the PV collector to the water heater when other loads are met and the battery is fully charged before power is diverted to the water heater.

The solar photovoltaic (PV) energy supply system can include a utility grid energy connection adapted to supply energy to the first heating unit under control of the controller when the output from the PV collector is below a minimum value.

The solar photovoltaic (PV) energy supply system can include first and second multi-element heating units, and a changeover switch controlling the neutral connection of the two heating units, corresponding elements of the first and second heating units being controlled by the same switches.

According to an embodiment of the invention, there is provided a method of utilizing solar photovoltaic energy in an impedance load, the impedance load including two or more impedance components, at least one of which is switchable, the method including the steps of:
converting DC energy from a solar photovoltaic (PV) collector to produce an unmodulated alternating supply;
modulating the unmodulated alternating supply to produce a modulated alternating supply;
applying the modulated alternating supply to one or more of the load components.

The method of utilizing solar photovoltaic energy can include the step of:
applying the modulated alternating supply to only one of the impedance components.

The method of utilizing solar photovoltaic energy can include the step of:
monitoring the direction of energy flow to or from the utility grid.

The method of utilizing solar photovoltaic energy can include the step of:
applying the unmodulated alternating supply to at least one other impedance component.

The method can include the steps of;
initially reducing the modulated alternating supply voltage to a minimum value, and
increasing the modulated alternating supply voltage until a maximum current is drawn, or until the maximum modulated alternating supply voltage is reached,
in the case where modulated alternating supply voltage is reached,
reducing the modulated alternating supply voltage to the minimum,
switching on a second impedance component,
increasing the modulated alternating supply voltage applied to the first impedance element, and
repeating steps i) to l) until energy flow to the utility grid ceases.

The method can include the steps of:
monitoring the direction of energy flow to or from the utility grid.

The method can include the steps of:
varying the modulation of the modulated alternating supply;
determining when the flow of energy to the utility grid ceases; and
maintaining the modulation at a level which maintains the energy delivered to the first impedance at or approximate to the level where the flow of energy to the utility grid ceases.

The first impedance component can be switchable.

All the heating elements of the first heating unit can be switchable.

According to an embodiment of the invention there is provided a method of utilizing a variable energy source together with an alternating utility grid supply to provide power for at least two loads, at least a first of the loads being controllable, the utility grid supply and the variable energy source being connected to a common conductor, wherein the first load is prioritized after the remaining load or loads, and the variable energy supply is adapted to deliver its available energy to the loads in priority to the utility grid supply, the method including the steps of:
monitoring the flow of current to or from the utility grid supply;
where current is flowing to the utility grid supply, increasing the energy supplied to the first load until either:
A. the flow of current to the utility grid ceases; or
B. the maximum energy available from the variable energy source is delivered to the first load.

The first load can include two or more heating elements; wherein a first heating element is supplied from the variable energy source via a controllable power modulator, and wherein the remaining heating elements are switchable in a parallel configuration with the first heating element; and the step of increasing the energy supplied to the first heating element can be performed by continually increasing the output from the power modulator until either:
C. the flow of current to the utility grid ceases; or
D. the output of the modulator reaches a maximum;
wherein, if the modulator output reaches the maximum,
the modulator output is reduced,
a second heating element is switched on in parallel with the first heating element, and
the modulator output is continually increased, until either condition C or condition D is reached, wherein if condition D is reached, the process of switching on further heating elements in parallel is carried out until either all the heating elements are switched on and the modulator output is at the maximum; or until the flow of current to the utility grid ceases.
The method can further include repeatedly reducing the modulator output to zero, switching each of the remaining heating elements on sequentially and increasing the modulator output to its maximum or until the flow of current to the utility grid ceases.

According to an embodiment of the invention, there is provided a method of operating a water heater connected to a utility grid and to a variable energy source, the heater having an upper heating unit and a lower heating unit, wherein at least the upper heating unit has two or more heating elements, the method including the steps of detecting the flow of energy from the variable energy source to the utility grid, applying a first amount of energy to the upper heating unit, and applying a second amount of energy to the lower heating unit, increasing the amount of energy delivered to the upper heating unit, monitoring the flow of energy from the variable energy source to the utility grid, and ceasing to increase the delivery of energy from the variable energy source to the upper heating unit when the flow of energy from the variable energy source to the utility grid ceases.

According to an embodiment of the invention, there is provided a controller for a solar PV energy supply system adapted to provide utility grid energy feed-in, and to deliver energy to one or more internal consumption systems one of which is a water heating system having a heating unit with one or more heating elements, wherein the solar PV energy is converted to an alternating PV energy supply controllable by the controller, the controller being adapted to monitor the direction of energy flow to or from the utility grid and to control the alternating PV energy supply to prioritize the energy delivered to the internal consumption systems in preference to the utility grid feed-in.

The water heating system includes a storage tank with at least one heating unit and an energy modulator adapted to modulate the alternating PV energy supply, the heating unit having at least two switchable heating elements at least one of which is supplied with energy from the modulator, the controller being adapted to control the modulator to prioritize delivery of energy to the water heater in preference to the utility grid energy feed-in.

The controller can be adapted to initially reduce the modulator output to zero and apply the modulator output to a first heating element, and progressively increase the modulator output to a maximum, and progressively switch in additional heating elements as required until maximum energy is delivered from the PV collector or the flow of energy to the utility grid ceases.

When switching in each successive heating element, the controller reduces the modulator output to the first heating element to zero, and then progressively increases the modulator output to the first heating element.

According to an embodiment of the invention, there is provided a method of utilizing solar photovoltaic energy in a system having a first load circuit, a water heater and a utility grid feed-in path, the system including a controller controlling delivery of the PV energy to the water heater, wherein the controller prioritizes the delivery of PV collector energy to the first load, the water heater and the utility grid feed-in.

The method can include the step of: providing hysteresis in the switching of elements.

Hysteresis can be provided by imposing non-zero modulated energy to the switchable element during each switching operation.

Hysteresis can be provided by imposing delaying the switching of elements.

The system can include a PV storage battery, and wherein the controller can prioritize the delivery of PV collector energy to the first load, the water heater, the battery, and the utility grid feed-in.

According to an embodiment of the invention, there is provided a variable energy usage arrangement for a water heater the arrangement to control energy flow from a variable energy supply and a utility grid supply to a water heater, the arrangement including a controller, a modulator, a heating unit having at least first and second heating elements and an attachment flange, wherein the second and any further heating elements being switchable, the controller being adapted to control the modulator and the switchable elements, the modulator being adapted to deliver a controllable power output to the first heating element under the control of the controller, the attachment flange being adapted for sealed attachment to a water heater tank, the controller being adapted to monitor the direction of current flow outwards to the utility grid supply or inwards from the utility grid supply, the controller being adapted to control the modulator and the switchable elements, to minimize or eliminate current flow out to the utility grid supply.

BRIEF DESCRIPTION OF THE DRAWINGS

FIG. 2B illustrates a modified circuit diagram for a dual element water heating system according to an embodiment of the invention.

FIG. 2C shows detail of a parallel arrangement of a triac and a relay.

FIGS. 3A, 3B, 3C and 3D illustrate heating element switching plans according to corresponding embodiments of the invention.

FIG. 5 illustrates modes of modulating AC power.

FIG. 6 illustrates a heating unit having two separately operable heating elements.

DESCRIPTION OF THE EMBODIMENTS

Figure 1A:
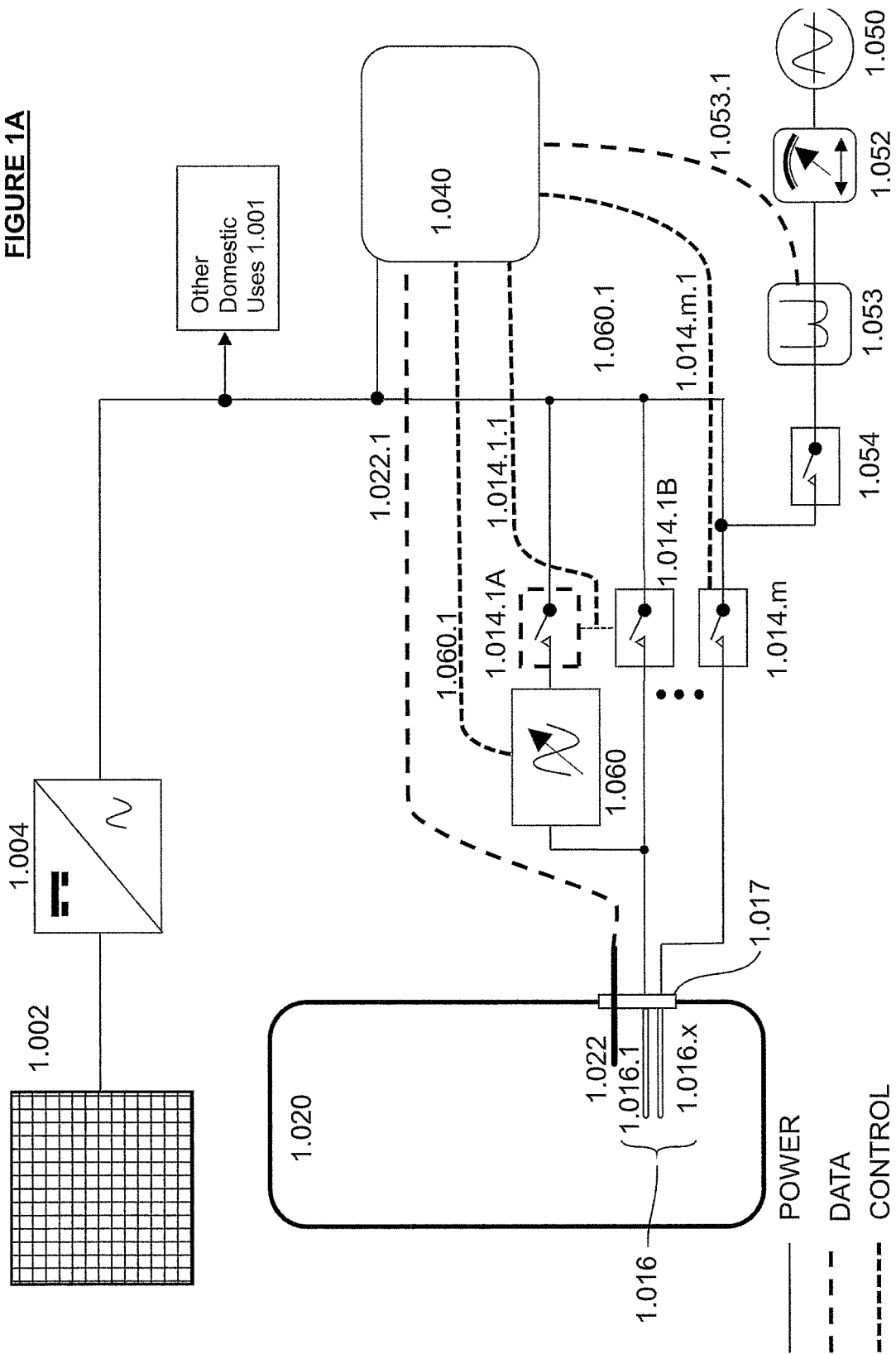
FIG. 1A illustrates a PV water heater arrangement according to an embodiment of the invention.

The PV water heating system illustrated in FIG. 1 includes a PV collector (1.002), an inverter (1.004), a water tank (1.020), a heating unit (1.016) having two or more elements (1.016.1 . . . 1.016.x), a temperature sensor (1.022), a number of switches, (1.014.1A to 1.014.m), each associated with a heating element, an AC modulator (1.060), utility grid supply (1.050, bidirectional utility grid meter (1.052), utility grid switch 1.054), and controller (1.040). Because heating element 1.016.1 is powered via the modulator, the switch (1.014.1A) is optional, as the modulator output can be reduced to zero.

The PV collector (1.002) is connected to inverter (1.004) which converts the DC voltage output from the PV collector to an alternating voltage supply suitable for delivery to the utility grid. A water storage tank (1.020) has a first multi-element heating unit which is inserted in the lower portion of the tank via a sealed flange (1.017). While temperature sensor (1.022) is shown inserted via flange (1.017), it could be inserter via a separate sealed opening, which could be in the top of the tank. Temperature sensor 1.022 is located to measure the temperature of the water proximate the heating unit with two or more individual heating elements (1.016.1, 1016.x). It is understood that the tank may be equipped with two or more temperature sensors at different vertical locations.

Circuit (1.001) delivers power to other domestic devices. The other domestic uses will normally take precedence over the water heater for the delivery of PV energy.

The output from the inverter (1.004) is connectable to at least one of the elements (1.016.1 . . . 1.016.x) via corresponding ones of the switches (1.014.1A . . . 1.014.m).

In the embodiment of FIG. 1, modulator (1.060) modulates the AC inverter output supplied to one of the heating elements (1.016.1).

Controller (1.040) is adapted to receive system information, such as sensor information from temperature sensor (1.022) via link (1.022.1), and utility grid current flow information from current sensor (1.053) via link (1.053.1). This enables the controller to monitor the direction of energy flow to or from the utility grid. The current sensor can be a modular device with internal communication capability which may enable the current sensor to send the information to the controller by a number of different links, such as household power line, Bluetooth, WiFi, or physical cable. Alternatively, the current flow can be obtained from the power utility's bi-directional meter (1.052) if the power utility consents to this. The current sensor provides feedback to the controller on the effect of the adjustment of the modulator output by the controller.

The controller is adapted to control the switches (1.014.1 . . . 1.014.m) via control links (1.014.1.1 . . . 1.014.m.1). The controller also controls the modulator (1.060) via link (1.060.1). The controller can be a programmable controller or other suitable microprocessor controlled device adapted to respond to the inputs and to control circuit elements, such as switches 1.014A, 1.014B, 1.014m. The controller can control the connection of the alternating inverter output or the utility grid power to one or more of the heating elements.

The utility grid power supply (1.050) can be connected to the heating elements via the individual element switches and utility grid breaker switch (1.054).

The two or more individual heating elements (1.016.1, 1016.x) can be connected individually or in combinations of two or more elements to a source of electric power, such as solar collector 1.002 (via inverter (1.004), or utility grid power 1.050. Because element (1.016.1) is modulated, it can be connected to two switches (1.014.1A and 1.014.1B). Controller (1.040) controls the switches such that switch (1.014.1A) connects PV supply to modulator (1.060) when PV supply is available and the temperature of the water in the tank is below a maximum allowable temperature (the maximum temperature threshold). When there is no PV supply (eg, at night), the controller can open switch (1.014.1A) and the controller can operate switch (1.014.1B) to connect utility grid power to heating unit if the water is below a second, normally lower, temperature threshold. The controller can also take account of time-of-day tariffs to reduce the cost of using the utility grid power.

The resistance of the elements can be equal, or one or more of the elements can have a different resistance from the other elements. The arrangement of FIG. 1 will be described with the heating unit having three heating elements (A, B, C), the highest power element (C) having a resistance of Q ohms, and the other two elements (A, B) having equal resistances of 2 Q ohms. In the example of FIG. 3, elements A and B have a power rating of 900 W, and element C has a rating of 1800 W, for a 240 v AC supply, providing a combined power rating of 3600 W.

The controller receives inputs from the temperature sensor (1.022) and the utility grid current sensor (1.053) or the bidirectional utility grid power meter (1.052). When a large amount of power is generated by the PV collector, it may exceed the demand from the other domestic uses (1.001). In previous feed-in system, the excess power from the PV collector would have been fed into the utility grid, the meter (1.052) calculating the amount of power delivered to the utility grid and the power utility company would credit the home owner with the amount of power at the specified feed-in tariff.

According to an embodiment of the invention, when the controller (1.040) detects that power is flowing from the PV collector to the utility grid, it can activate the water heater circuits to divert the PV energy to the water heater. Only if the amount of PV collector power exceeds the demands of both the water heater and the other domestic uses is the excess PV collector power delivered to the utility grid.

The switchable heating element configuration shown in FIG. 3 has the advantage of enabling a continuous variation of output power from the modulator while only one element in this example, element A, which can correspond with element (1.016.1), is powered via the modulator (1.060).

In the exemplary embodiment, with complementary heating elements, element A is a 900 W element, element B is a 900 W element, and element C is an 1800 W element, or more generally, elements A & B each have an impedance value of 2R, while element C has a value of R.

It is assumed that, in an initial state, the heating elements are unpowered, and the current sensor indicates current flowing out from the inverter into the utility grid. When the controller detects such a state, it initiates a process to divert the excess energy from the utility grid into the water heater, while continuously monitoring the current flow direction via the current sensor. The current sensor can sample the current at a sufficiently high sampling rate to enable the controller to track the effect of each adjustment of the modulator output.

In Stage 1, only element A is energized (switch (1.014.1A) closed). The controller controls the modulator so that the output of the modulator initially starts at zero volts, and then increases the modulator output until full power of 900 W is delivered to element A or until the current sensor detects that current flow out to the utility grid has ceased.

If the current sensor detects that current is still flowing out to the utility grid, the controller initiates Stage 2. At Stage 2, the controller switches on element B at its full 900 W power while also reducing the modulator output to zero, so that no power is delivered to element A. Element A can then be ramped up from zero to 900 W, giving a combined power of 1800 W from the combination of elements A and B. Again, if the current flow out to the utility grid stops before the full power is delivered to elements A & B, the controller will stop increasing the output from the modulator.

In Stage 3, elements A & B are switched off, and element C is switched on maintaining the power at 1800 W. Element A is again ramped up from zero to 900 W, resulting in power usage of 2700 W, being the combination of elements A and C. Again, if the current flow out to the utility grid stops before the full power is delivered to elements A & C, the controller will stop increasing the output from the modulator.

In Stage 4, element A is switched of and element B is switched fully on providing an initial power consumption of 2700 W. Again, element A is switched on and can be ramped up from zero to 900 W, resulting in 3600 W being delivered to the water tank via the combination of elements A, B, and C. Again, if the current flow out to the utility grid stops before the full power is delivered to elements A, B & C, the controller will stop increasing the output from the modulator. If the current is still flowing out to the utility grid, the bi-directional meter (1.052) will continue to credit the customer for the energy supplied.

Optionally, the utility grid can be connected to element (1.016.1) via switch (1.014.1B) while bypassing the modulator (1.060). When there is no useful output from the PV collector, eg, at night time, and utility grid power is needed to heat the water, switch (1.014.1A) is opened, so the utility grid power is not fed via the modulator (1.060) to element (1.016.1).

The inverter can be designed to draw power from the PV collector up to the maximum power point of the PV collector at the current level of insolation. When there is insufficient solar energy to fully meet the other domestic demand, the inverter ensures the delivery of the available PV energy to the load before utility grid power is drawn. The inverter may do this by adjusting the phase and amplitude of the inverter output voltage relative to the utility grid voltage.

Figure 1B:
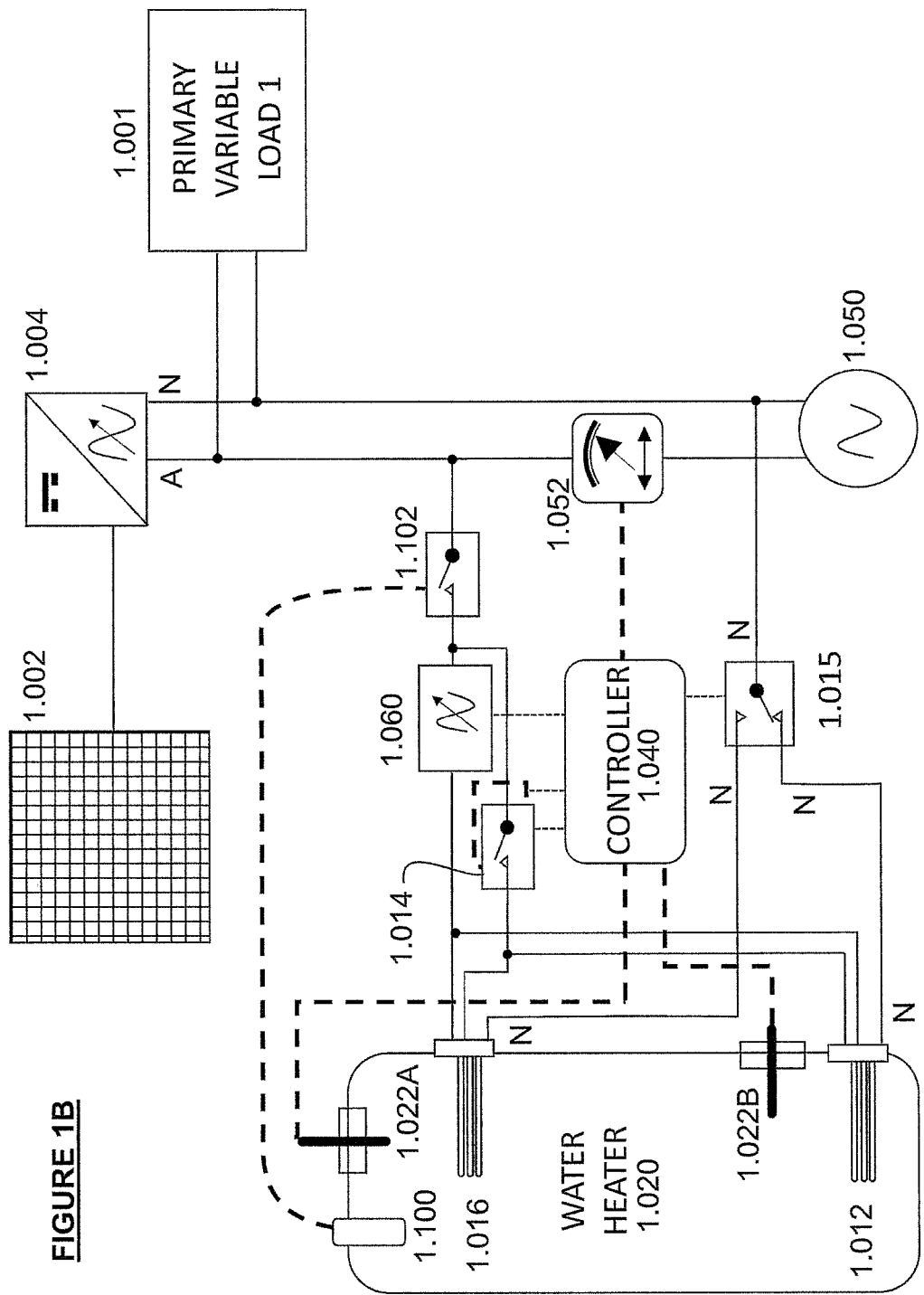
FIG. 1B illustrates an embodiment of the invention including a thermostat and a power control arrangement according to an embodiment of the invention.

In the description of FIG. 1B, a distinction is made between thermostat and temperature sensors. A thermostat is a mechanical device whose physical thermal characteristics are such as to change state at a set temperature. A temperature sensor can act as a thermometer to provide a continuous reading of temperature. An additional feature of FIG. 1B is the use of neutral switching, explained in more detail below with reference to FIG. 2B, the line A being active, and the line N being neutral. This enables the controller [1.040] to select either the upper heating unit [1.016] or the lower heating unit [1.012].

FIG. 1B illustrates a water heater having first and second heating units [1.012] located in a lower portion of the tank, and [1.016] located in an upper portion of the tank. A thermostat arrangement including a temperature monitor [1.100] and a thermostat switch [1.102] can be provided in a minimal configuration.

The thermostat can operate independently of the controller [1.040].

In one mode of operation of the minimal configuration without optional temperature sensors [1.022A], [1.022B], the thermostat can be set to an upper temperature threshold, eg, 75° C. Where there is excess PV energy as indicated by, for example, the flow of current out to the utility grid, and when the water in heated by the lower heating unit [1.012] reaches the upper temperature threshold as sensed by the thermostat temperature monitor [1.100], the thermostat switch [1.102] will interrupt the flow of current to modulator [1.060] and the heating element switches [1.014]. This results in the excess PV energy being delivered to the utility grid.

Normally, power from the utility grid will only be delivered to the water heater during off-peak periods. If utility grid power heating of the water in the tank is required in an off-peak period when not PV energy is available, the controller can be programmed with the utility tariff schedule and select the upper heating unit [1.016] so the utility grid power is only used to heat the water in the upper portion of the tank. If the thermostat is the only temperature sensitive device in the tank, the mains power will heat the water to the upper temperature threshold. This method thus limits the use of utility grid power. The off-peak utility grid power may be used to heat the upper portion of the tank to limit the consumption of utility grid power. A second heating unit, such as [1.012] can be used when there is excess variable source energy, such as PV energy, to heat the whole tank to the upper temperature threshold as detected by the thermostat. Alternatively, a second temperature sensor [1.022B] being used to monitor the temperature in the lower section of the tank.

Optionally, at least a first temperature sensor [1.022A] can be located in an upper portion of the tank.

In a second configuration, including temperature sensor [1.022A], the controller can utilize the information from temperature sensor [1.022A] to set a second, lower temperature threshold, eg, 60° C. in the upper portion of the tank when utility grid power is being used to reduce the usage of grid power.

In a further configuration, when PV energy is used to heat the whole tank using lower heating unit [1.012], a further temperature sensor [1.022B] can be provided to measure the temperature in the lower portion of the tank. When the tank is heated to a chosen temperature threshold, the controller can switch the heating units off, and divert excess PV energy to the utility grid.

The controller can be programmed with the off-peak times, and can also be adapted to receive off-peak time information via a communication link with the utility company, so that the controller is aware of pre-programmed off-peak times, or so that the controller can be informed of variable load periods when it is preferable to power the water heater from the utility grid when no variable source power is available.

Figure 1C:
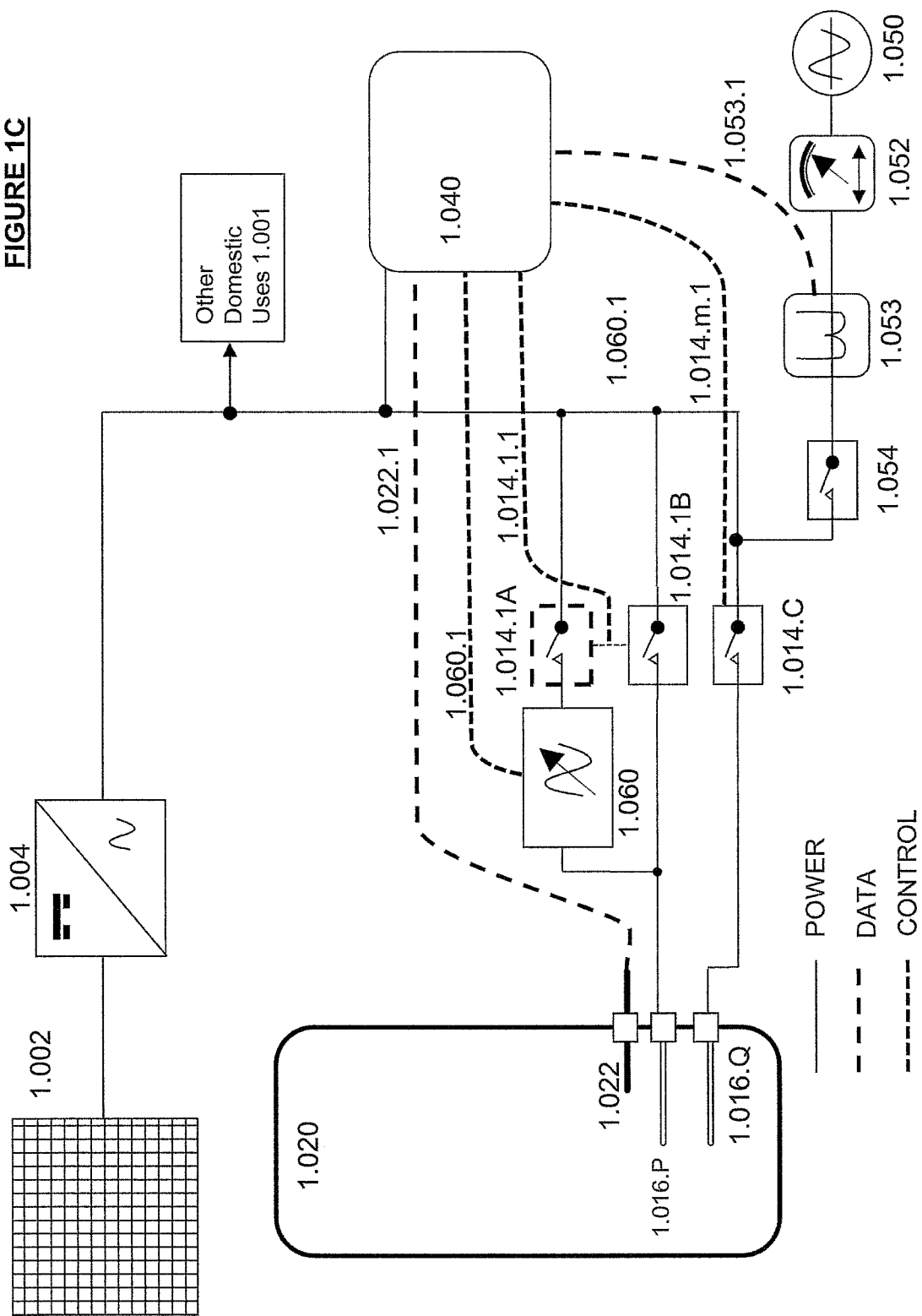
FIG. 1C illustrates an embodiment of the invention having one modulated switchable element and one switchable, non-modulated element.

FIG. 1C represents a system similar to that of FIG. 1A, but with a reduced number of heating elements illustrates an embodiment of the invention having one modulated switchable element 1.016.P, and one switchable, non-modulated element 1.016.Q. These elements can be separately mounted in the tank, and the temperature sensor 1.022 can also be separately mounted in the tank. This embodiment is adapted to perform the switching and modulation operations of Stage 1 and Stage 2 of FIG. 3A.

Figure 2A:
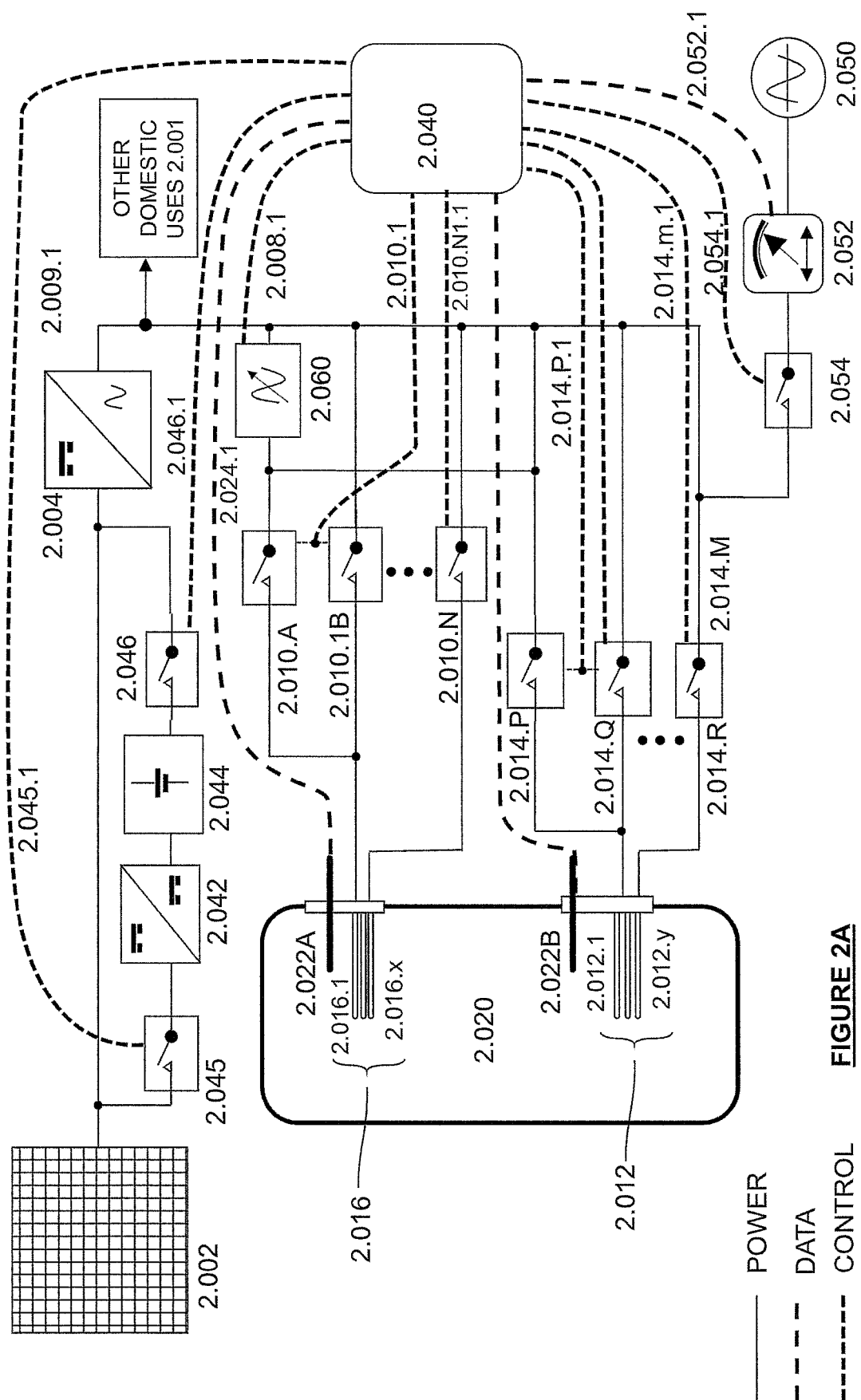
FIG. 2A illustrates a PV water heater arrangement according to another embodiment of the invention.

FIG. 2A illustrates a PV feed-in and water heating system having two multi-element heating units according to the invention, the system including: water tank (2.020), a first heating unit (2.016) having one or more heating elements (2.016.1 . . . 2.016.x), a second heating unit (2.012) having two or more elements (2.012.1 . . . 2.012.y), a first temperature sensor (2.022), a PV collector (2.002), battery charge switch (2.045), DC to DC regulator (2.042) which may also have an associated smoothing filter, battery (2.044), battery output switch (2.046), inverter (2.004), a group of first element switches, (2.010.A . . . 2.010.N), each associated with an element of the first heating unit, a second group of second element switches (2.014.P to 2.014.R), an AC modulator (2.060), utility grid supply (2.050), bidirectional utility grid meter (2.052), utility grid breaker switch (2.054), and controller (2.040). The modulator (2.060) is connected to supply either element (2.016.1) or element (2.012.1) depending on whether switch (2.010.A) or (2.014.P) is closed under control of controller (2.040).

In a manner similar to that discussed in relation to FIG. 1, the controller (2.040) receives inputs from the temperature sensor (2.024) and the bidirectional utility grid power meter (2.052).

As discussed with reference to FIG. 1, when a large amount of power is generated by the PV collector, it may exceed the demand from the other domestic uses. The controller (2.040) can deliver the PV collector power to the following entities in order of preference:

1. Other domestic uses (2.001);
2. water heater (20020);
3. utility grid feed in via bidirectional meter (2.052).

In the embodiment shown in FIG. 2A, battery (2.044) can be used to store energy from the PV collector 2.002 when the PV collector output exceeds demand from the premises and the water heater is at maximum temperature, in which case controller (2.040) closes battery charge over switch 2.045 and enables the PV current to be directed into the battery via DC regulator (2.042) in priority before PV collector power is delivered to the utility grid.

Battery output switch (2.046) can connect or disconnect the battery from the rest of the circuit. When the battery is fully charged and there is no demand from the premises, the PV power can be fed into the utility grid via the bidirectional meter (2.052). The battery charging system will normally have a charge detector to determine when the battery is fully charged.

The tank is fitted with two heating units, an upper heating unit (2.016) and a lower heating unit (2.012). Heating unit (2.016) is a multi-element heating unit (2.012.1 . . . 2.012.y) with associated switches (2.010.A . . . 2.010.N) and can be adapted to be connected to either the PV supply or the utility grid supply. The lower heating unit can have one or more elements and can be adapted to operate with utility grid power or PV collector power. Switch (2.054) connects the utility grid to the internal wiring, including the water heater and the other domestic uses circuit. As shown in FIG. 1, the tank can be fitted with only one heating unit having two or more heating elements.

The controller, modulator and multi-element heating unit with attachment flange, as shown in FIG. 6, can be provided in a form suitable for retro-fit assembly to an existing tank to replace a single element heating unit with attachment flange. A current transformer to measure the incoming or outgoing current would also be provided, and the temperature sensor would be replaced or fitted with an adaptor to ensure compatibility with the controller.

The controller can be programmed to activate the upper heating unit (2.016) to heat the upper portion of the tank before the lower heating unit is activated.

The arrangement of FIG. 2A can also be operated in a manner to quickly deliver heated water in the upper portion of the tank, while also heating the remainder of the water in the tank. A proportion of the PV energy can be delivered to the upper heating unit [2.016], and the remainder of the excess PV energy can be delivered to the lower heating unit [2.012]. All the heating elements of the upper heating unit can be powered, while only one of the lower heating elements need be powered. The lower heating element will create convection circulation, so while the water in the upper portion of the tank heats rapidly, the water in the remainder of the tank is also heated. The lower heating element can be disposed asymmetrically in the tank to enhance the circulation. Thus, for example, three quarters of the available excess PV energy can be delivered to the upper heating unit, and one quarter can be delivered to the lower heating unit, eg, by selecting only one of the heating elements of the lower heating unit.

FIG. 2B illustrates a wiring connection arrangement according to an embodiment of the invention, and FIG. 2C illustrates details of triac/relay combination used in an embodiment f the invention. The embodiment of FIG. 2B provides the same heating unit control functionality as the arrangement of FIG. 2A, but requires fewer switches. The active (A) and neutral (N) lines of the wiring circuit are shown as the arrangement of FIG. 2B utilizes neutral line switching to enable a reduction in the number of switches.

The utility grid power (2.050) and the output from the PV collector's (2.002) inverter (2.004) connect to the active and neutral lines.

All the neutral connections of each element in the first heating unit are connected together. Similarly, all the neutral connections of each element in the second heating unit are connected together. A thermal cutout switch [2.070] may be mandated by safety regulations.

The heating element switches 2.062, 2.017, and 2.019 include triacs connected to controller 2.040 via links 2.062.1, 2.017.1, and 20.19.1 respectively. Switches 2.017 and 2.019 are adapted to act as ON/OFF switches and incorporate relays such as 2.017.2 with metal contacts 2.017.3 in parallel with the triac 2.017.0 so the metal contacts carry the current when the switches are closed. When the controller instructs the switch to open, the triacs are designed to open after the relay operates to avoid arcing of the metal contacts.

The triac 2.062 is designed to act as a modulator, so the controller can vary the amount of current passing through the triac to heating element 2.016.1 or 2.013.1, depending on the state of switch 2.015. The controller controls the modulator by applying a signal to the control electrode of the triac to turn the triac on, while removing the signal causes the current to cease at the next zero crossing as shown in FIG. 5. With a purely resistive load, the current and voltage are in phase. Using phase angle control as discussed below with reference to FIG. 5B, the triac [2.062] is switched on during each successive half cycle by a short pulse from the controller. Thus the triac [2.062] is used as a modulator under control of the controller [2.040]. While the triac [2.062] is shown as separate from the controller [2.040] it is understood that the controller and the triac can be incorporated in a single module. The controller implements a control routine based on the temperature and current flow direction information to generate the control signals for the triacs.

Triac/relay combinations (2.017) and (2.019) (discussed further with reference to FIG. 2C), control (under command of the controller) the connection of the heating elements (2.016.2) and (2.016.3) of the first heating unit to the active line. The connection of element (2.016.1) to the active line is controlled by triac (2.062). Similarly, the active connections of elements (2.012.2) and (2.012.3) of the second heating unit are controlled by the Triac/relay combinations (2.017) and (2.019), while the active connection of element 2.012.1 is controlled by triac (2.062). The triac (2.062) performs both the modulation and switching function to deliver modulated AC power to the elements (2.016.1) and (2.012.1). Change-over switch (2.015) is adapted to complete the power circuit to either the first heating unit or the second heating unit by closing or opening the corresponding neutral path to the first or second heating unit.

FIG. 2C illustrates the parallel connection of a triac (2.017.1) and a relay connection (2.017.3). The relay coil (2.017.2) operates the relay connection. The relay connection is a metal connecting path and thus has lower conduction losses than the triac. When the combined triac/metal relay switch is closed the current flows via the metal contact because of the lower resistance of the metal contact path. The triac has the advantage of being able to implement zero-crossing switching. Thus, when the combined switch is to be opened, the metal relay contacts are opened, diverting the current via the triac. The triac can then interrupt the current at the zero-crossing.

Figure 4:
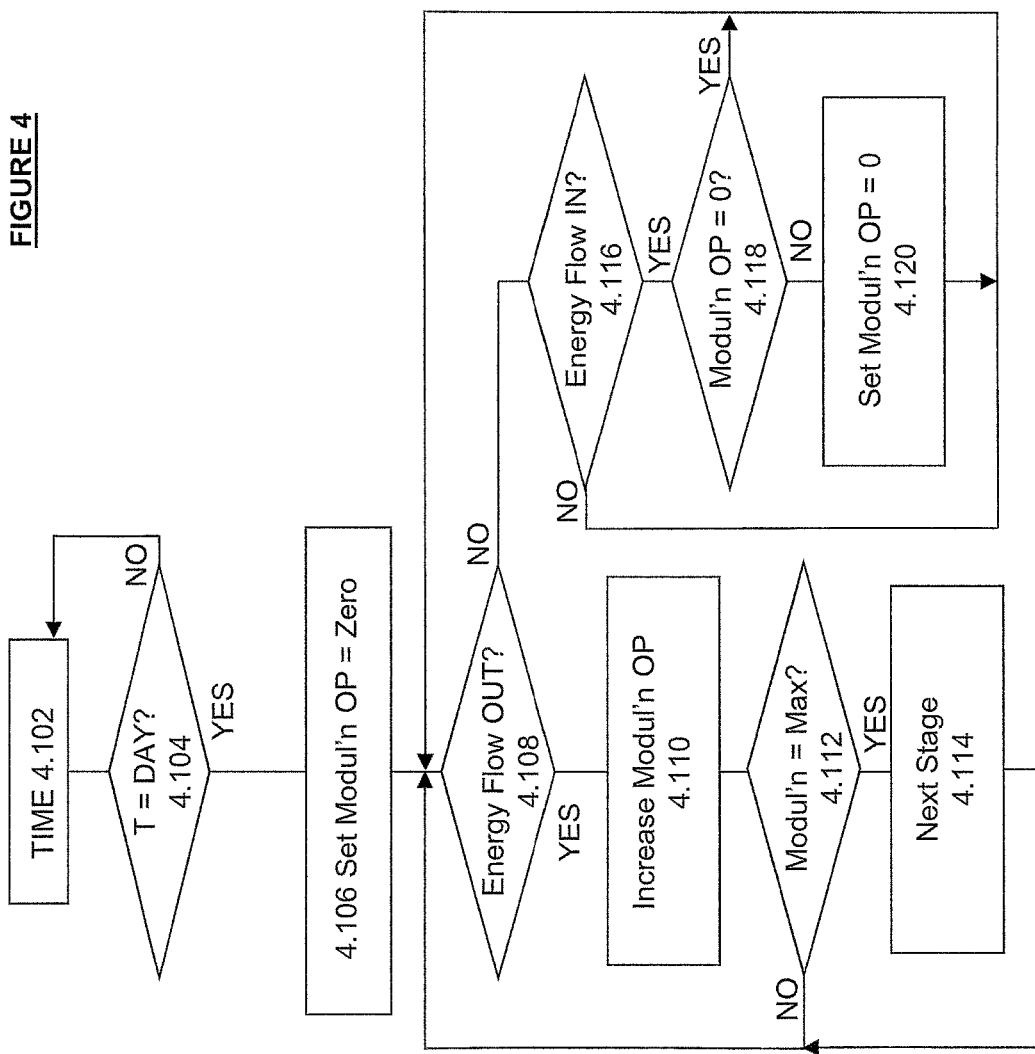
FIG. 4 illustrates a flow diagram showing a method of operating a water heating system according to an embodiment of the invention.

The controller is configured with the operating characteristics of the modulator, so it knows when the modulator is at its maximum output setting. The controller is adapted to increase the modulator output in incremental steps, and to receive current flow monitoring information from the current transformer or utility grid meter so the controller can assess the result of each change in the modulator output. In addition, the inverter is adapted to set its output to correspond with the solar collector maximum power point (MPP). FIG. 4 illustrates a method of controlling the delivery of energy from the PV collector to the heating unit:—

[step 4.102-4.104] Start condition, eg, Time (, sunrise+30 minutes) or output from inverter;
[step 4.106] Stage 1 (Switch A) Set modulator (2.060) to zero;
[step 4.108] Monitor energy flow in or out
[step 4.110] If flow out, increase modulator output;
[step 4.112] Check if modulator output is at maximum;
[step 4.114] If not maximum, return to [step 4.108], which begins a continuous process of monitoring the flow of current to or from the utility grid;
[step 4.116] If at maximum, switch to next stage (eg, Stage 2—switch A+B) and return to [step 4.108];
If [Step 4.108] indicates there is no flow out, go to [step 4.116] and check if there is inward flow from the utility grid;
If there is no inward utility grid flow, return to step [4.108];
If there is inward utility grid flow, check if modulation output is zero at step [4.118];
If modulation output is zero, return to step [4.108];
If modulation output is not zero, set modulation output to zero at step [4.120] and return to [step 4.108] to continue monitoring the current flow to or from the utility grid;

The method of FIG. 4 provides a continuous feedback process in which the controller monitors the flow of current to or from the utility grid, and when there is flow to the utility grid from the inverter, the controller powers the modulator until either all the available energy from the inverter is used in meeting the domestic load and partially powers the water heater, or until both the domestic load and water heater are fully powered from the inverter, and any surplus energy is exported to the utility grid. If there is insufficient energy available from the inverter, the inverter is designed to share the load with the utility grid, ensuring that all the energy from the solar collector is consumed before drawing power from the utility grid. The current transformer or utility grid meter provide continuous feedback to the controller as to the effect of each adjustment of the modulator output when there is surplus PV energy being exported to the utility grid.

The modulation of the voltage in four stages can be smooth and linear from zero to maximum. However, other modulation schemes may be implemented such as starting at the top of Stage 2 and then moving up or down depending on the utility grid meter flow direction. Alternatively, where the controller monitors the actual level of energy flow as well as the direction, this can be used by the controller to calculate a starting point modulation likely to cancel the flow, and can then increase or decrease modulation depending on the flow direction.

FIG. 5 shows two types AC power modulation which can be implemented using triacs.

FIG. 5A illustrates burst fire control, in which power is modulated by switching the current on (5.152) for a number of AC cycles and off for another group of cycles (5.154). The burst fire control signal (BFCS) [5.151] to [5.153] from the controller [2.040] can be maintained for a number of half cycles, and the trailing edge of the BFCS can occur before the end of the last half cycle as the triac will continue to conduct until the zero crossing of the last half cycle in which the BFCS was removed. Switching can be timed to coincide with the zero crossings (5.156) of the current. By adjusting the duty cycle, the power delivered can be modulated. Burst fire control can cause problems such as flickering of lights when it is carried out on utility grid power.

In an alternative BFCS arrangement shown in FIG. 5A, the controller can generate short control pulses spanning the zero crossings at the beginning of each half cycle for the duration of the required current burst. The short pulses can commence before the zero crossing of the previous half cycle and continue after the zero crossing.

FIG. 5B illustrates phase angle control, in which current is switched on for a portion of each cycle (5.164) and is switched off for the rest of the cycle (5.162). The phase angle control signal (PACS) from the controller can be a short pulse [5.16.5], sufficient to turn the triac on, but ends within the same half cycle so that the zero crossing extinguishes the current. Again zero-crossing switching is used in switching off to mitigate arcing. Phase angle control generates a significant amount of electromagnetic interference (EMI) due to the asymmetric nature of the current. FIG. 5B illustrates leading edge phase angle control suitable for use with triacs, as the zero crossing of the waveform is used to extinguish the current.

While the embodiments of the invention may utilize phase angle control as discussed with reference to FIG. 5B, the invention may utilize any of the available modes of modulation.

By limiting the amount of energy delivered by phase angle control, ie, modulating a lower power element such as a 500 W or 900 W element instead of modulating, for example, a single 3600*w* element, the amount of interference can be limited.

FIG. 6 illustrates, by way of example, a heating unit (6.200) having three separately switchable heating elements (6.204, 6.205, 6.206, 6.205 being largely obscured by 6.204). While only two elements are clearly visible to avoid an over-complex drawing, it is understood that the heating unit can have more than two or more elements. Element 6.206 has a greater energy ratng, and hence lower resistance than elements 6.204 and 6.205, it has a greater length and surface area to provide greater contact with the water in the tank to provide more efficient heat transfer. The elements are mechanically affixed to flange 6.208, from which they are electrically insulated. The elements are designed to pass through an aperture in the tank wall. The flange is designed to sealably close the aperture. Each heating element has electrical terminals (shown collectively at (6.210)), which pass through the flange attachment to the exterior of the tank. Electrical cable (6.212) and electrical connector (6.214) enable power to be supplied to the heating elements individually or collectively.

The elements of a water heater with switchable elements can be switched using electromechanical relays. Such relays are subject to degradation over time, as physical wear and electrical erosion damage the switch contacts. It is thus desirable to reduce the operation of the electromechanical relays.

An embodiment of the invention proposes the use of hysteresis to reduce the number of times a relay needs to switch during the day.

In one alternative embodiment of the invention, hysteresis can be provided by using an offset energy input for the modulated element during the element switching operation. The heating elements B, A, C can be rated at 850, 1050, and 1700 watts respectively, again providing a maximum rating of 3.6 kW for the three elements in parallel. However, instead of using the lowest rated element (850 W in this embodiment) as the modulated element, one of the higher rated elements is chosen as the modulated element. By selecting one of the higher rated elements, the frequency with which the electromechanical relays connecting the elements to the energy supply can be reduced.

In one embodiment, such as that shown in FIG. 1A, the switching protocol for this alternative arrangement having one modulated input element A rated at 1050 W, and two unmodulated elements, B, rated at 850 W, and C, rated at 1700 W, includes the steps of:

A. when there is excess solar energy available, switch in element A with the modulator set to provide a first power input level, which may be zero W;

B. ramp up the energy to element A until the available excess solar input is reached or until the maximum power (1050 W) is applied to element A;

C. where the available excess solar input exceeds the element A's rated input, the energy input to the 1050 W element can be reduced to a second value, which can be, for example, zero W (FIG. 3B), or which may be chosen to complement element B, eg, 200 W (FIG. 3C), so that the combined rating of the modulated element A and the unmodulated element B is equivalent to the energy rating of element A (1050 W);

D. at the same time, element B, is switched in in parallel with element A;

E. the energy input to element A is again ramped up until the available excess solar input is reached or until the maximum power (1050 W) is applied to element A, giving a combined input of 1900 W;

F. where the available excess solar input exceeds the combined rating of elements A & B, the energy to element A is again reduced;

G. element B is switched off;

H. element C is switched in parallel with element A;

I. element A is ramped up to its maximum rating or until the available excess solar input is reached;

J. where the energy to element A again reaches energy rating of element A, power to element A is again reduced, element B is switched in parallel with elements A & C; and K. element A is again ramped up to its maximum rating or until the available excess solar input is reached.

FIG. 3B shows the power delivery profile when element A is set to zero modulation at a transition. This produces a saw-tooth profile due to the differences in the impedances of the elements A, B, and C not being chosen to product a smooth profile as shown in FIG. 3A.

However, by using the controller to apply a complementary non-zero modulation to element A at each transition, it is possible to provide a smooth linear profile with hysteresis to prevent hunting at the transitions. As shown in FIG. 3C, where element A is switched to a complementary, non-zero value at each transition to achieve an approximately continuous linear range of energy input to the water heater, there is an overlap at each transition. A first overlap between 850 W and 1050 W occurs between the single element (element A) configuration and the A+B configuration. Similarly, an overlap occurs between 1700 W and 1900 W at the A+B to A+C transition, and a third overlap occurs between the A+C and A+B+C transition from 2350 W and 2750 W.

These overlaps can be used as hysteresis in the switching protocol implemented by the controller, so that a switching of the electromechanical relays does not need to occur within these overlaps. Switching in either direction need only occur at the edges of the overlaps. Thus, with falling solar input, switching would be programmed to occur at the lower edge of the overlap, while, for increasing solar input, switching could be programmed to occur at the upper edge of the overlap. This can reduce the frequency with which the electromechanical relays need to switch. The offset modulation of element A can be used to provide a smooth power profile with unmatched elements, to provide switching transition hysteresis, or both.

It is not necessary that the offset modulation cancels the saw-tooth profile of FIG. 3B entirely. Another offset modulation value can be chosen to provide sufficient hysteresis to reduce hunting during temporary fluctuations in solar input. FIG. 3D illustrates an arrangement in which the offset modulation applied to element A on switching between different combinations of elements is less than that required to completely eliminate the sawtooth profile, resulting in a reduced sawtooth profile (heavy line X). When solar input is increasing, the switching follows the reduced sawtooth profile X as indicated by dashed line Y (offset from line X for illustrative purposes). When the solar input is decreasing, the switching pattern follows the dotted line Z (also offset from line X for illustrative purposes).

Example 1

Initially, the system starts with the modulation of A set to zero, and B and C switched off. In Stage 1, as the solar input increases to provide excess soar energy, the modulation of A is increased. When the modulation of A reaches its maximum energy input (A=1050 W), the modulation of A is switched to H1 and B is switched in (Stage 2). Because B+H1<A, the modulation of A is increased so A=B+H1, and the modulation of A continues to increase as the solar input increases. Assuming the solar input begins to fall during Stage 2, switching back to Stage 1 occurs when the input equals the energy rating of B (850 W). Thus, with increasing solar input, switching from Stage 1 to Stage 2 occurs at 850+H1 W, while, with falling solar input, switching from Stage 2 to Stage 1 occurs at 850 W. Similar offset procedures are followed between Stage 2 and Stage 3, and between Stage 3 and Stage 4. Thus the offset of modulation of A by setting its switching value to H1 instead of zero provides hysteresis which prevents "hunting" of the system due to temporary fluctuations less than H1.

Alternative or additional methods of providing hysteresis can be used. For example, a time delay for switching the elements can be programmed into the controller to take account of transient fluctuations of solar input. A suitable duration of the hysteresis time delay may be determined empirically from meteorological observations. The time period may be variable, depending on the prevailing cloud coverage. In some instances, a delay of 30 seconds may be chosen, or a longer period may be chosen. A manual input may be provided with the controller so a user can set the hysteresis delay, or online information may be used to select the delay duration. The controller may be connected to, and programmable via a communication device providing internet access to online cloud-cover information and local geographical location information which can be used to select a suitable hysteresis time delay.

A potential source of unwanted operation of the elctromechanical relays is the random variation of solar input, due, for example, partial or complete occlusion of the solar collector, for example, when clouds overshadow the solar collector. This may be overcome by allowing the utility grid power to deliver power to the heating elements during such transient events. This method of operation can also reduce the switching of electromechanical relays. This can be achieved because the solar energy voltage can fall below the level of the mains voltage for the period of the transient occlusion.

Application

Solar electric heating has an advantage over direct solar thermal heating of water because, when the insolation is insufficient to heat the water or heat transfer fluid in the solar thermal collector to a temperature above the temperature of the water in the tank, no heat is added to the water in the tank. Solar photovoltaic, on the other hand has the advantage that, as long as there is sufficient insolation to power the solar PV collector, energy can be added to the water in the tank. Thus solar photovoltaic heating can operate to heat the water at lower levels of insolation.

The method of combining switching and modulation provides a means for continuously varying the current supplied to the heating unit. The current drawn from the PV collector can be continuously varied. This means that the current drawn from the PV collector can be matched to the maximum power point of the PV collector, enabling efficient use of the insolation at all levels.

The inventive concept can be applied to solar PV water heating systems having one or more multi-element heating units that are controlled by combining both modulation (varying power) and switching to achieve linear variable power control over the range zero to X kw's.

A three-element design can be chosen for a total 2 kW rating in 500 W steps. Changing the number elements and the modulator size (modulation increment) allows for many different variations on the design. The concept can be applied to discrete elements and that the modulator may or may not use the full rating of the individual elements in all cases to achieve the linear ramp up from 0 to the desired X kW.

An example of a tri-element heating unit can cover the range zero to 2.0 Kw (@ 240 v=28.8Ω; $(r=V^2/P)$. A element indexing step of 500 W can be used as this is common to many "off the shelf", Australian approved devices that use Triac based power modulation control. However other element ratings can be used.

The combination of progressively increasing the modulator output and progressively switching in additional elements facilitates the ability to provide a continuous range of input power to the heating unit from the PV collector.

The heating elements of the present invention can be designed as a replacement for a single element, the shape and size of the multi-element heating unit being adapted as a direct replacement for an existing single element heating unit. Thus a heating assembly with controller, modulator, element switching and multi-element heater can be provided as a replacement heating system for an existing single element water heater.

The invention claimed is:

1. A control system for a variable energy source utility grid feed-in system comprising:

a temperature sensor configured to detect a temperature of water in a water storage tank of a water heater;

a first energy consuming component having a first energy supply priority; and a second energy consuming component having a second energy supply priority and comprising a first heating element and a second heating element, the first heating element and the second heating element being configured to heat the water in the water storage tank, the first energy supply priority being greater than the second energy supply priority; and a controller configured to:
receive temperature data from the temperature sensor, the temperature data being indicative of the temperature of the water in the water storage tank;
receive, from a current sensor, current flow information identifying current inflow from a utility grid or current flow to the utility grid;
in response to determining that the temperature is less than a threshold temperature, activate the first heating element;
in response to determining that current is flowing to the utility grid and the temperature is less than a maximum temperature, activate the second heating element, wherein the maximum temperature is greater than the threshold temperature; and
direct a flow of energy from the variable energy source in order of priority to: (1) the first energy consuming component first, (2) the first heating element second, (3) the second heating element third, and (4) the utility grid last.

2. The control system as claimed in claim 1, further comprising a modulator configured to modulate a flow of energy from the variable energy source to the first heating element, wherein the modulator modulates a flow of current to the first heating element under the control of the controller.

3. The control system as claimed in claim 1, wherein at least the second heating element is switchable under the control of the controller via one or more switches.

4. The control system as claimed in claim 1, wherein the first heating element and the second heating element are switchable under the control of the controller via one or more switches.

5. The control system as claimed in claim 1, wherein the variable energy source is a photovoltaic (PV) energy source.

6. The control system as claimed in claim 1, including a bidirectional utility grid current sensor adapted to indicate to the controller the direction of energy flow to or from the utility grid, wherein the controller increases the energy to the first energy consuming component and the second energy consuming component until all the energy from the variable energy source is consumed or until energy is drawn from the utility grid.

7. The control system as claimed in claim 1, wherein the variable energy source is a solar photovoltaic (PV) energy supply system, the controller being adapted to deactivate the first and second heating elements when the temperature of the water exceeds the maximum temperature.

8. The control system as claimed in claim 7, wherein the solar photovoltaic (PV) energy supply system includes a battery chargeable by the PV energy supply system, the controller being adapted to divert PV energy from the PV energy supply system to either the battery or the first and second heating elements.

9. The control system as claimed in claim 7, wherein the solar photovoltaic (PV) energy supply system includes first and second multi-element heating units, and a changeover switch controlling a neutral connection of the first and second multi-element heating units, corresponding elements of the first and second multi-element heating units being controlled by the same switches.

10. A method of utilizing a variable energy source together with an alternating utility grid supply to provide power for at least a first load and a second load, at least the first load being controllable, the first load having a first heating element and a second heating element, the alternating utility grid supply and the variable energy source being connected to a common conductor, wherein the first load is prioritized after the second load, and the variable energy supply is adapted to deliver its available energy to the first load and the second load in priority to the alternating utility grid supply, the method including the steps of:
monitoring a flow of current to or from the alternating utility grid supply;
in response to determining that current is flowing from the variable energy source to the alternating utility grid supply and that a temperature of water in a water storage tank is less than a threshold temperature, activating the first heating element until either:
the flow of current to the alternating utility grid supply ceases; or
the output supplied to the first heating element from a controllable power modulator reaches a maximum; and
in response to determining that current is flowing from the variable energy source to the alternating utility grid supply after activating the first heating element and that the temperature of the water is less than a maximum temperature, activating the second heating element,
wherein the maximum temperature is greater than the threshold temperature.

11. The method as claimed in claim 10,
further comprising a controllable power modulator, wherein the controller is further configured to:
in response to determining that that the first heating element and the second heating element have both been activated and an output from the controllable power modulator to the first heating element has reached a maximum, switching on further heating elements in parallel until either all the further heating elements are switched on and the controllable power modulator output is at the maximum, or until the flow of current to the utility grid ceases.

12. A method of utilizing solar photovoltaic energy in an impedance load, the impedance load including a first power consuming component and a second power consuming component, the second power consuming component comprising a first heating element and a second heating element, the method including the steps of:
converting direct current (DC) energy from a solar photovoltaic (PV) collector to produce an alternating supply;
applying the alternating supply to the first power consuming component;
receiving temperature data from a temperature sensor, the temperature data being indicative of a temperature of water in a water storage tank;
monitoring a direction of current flow to or from a utility grid;
in response to determining that the temperature of the water is less than a threshold temperature, activating the first heating element;
in response to determining that current is flowing to the utility grid and the temperature of the water is less than a maximum temperature, activating the second heating element, wherein the maximum temperature is greater than the threshold temperature;
wherein the controller is configured to activate the first heating element and the second heating element until either current flow to the utility grid ceases or until all power consuming components are switched on.

13. The method of utilizing solar photovoltaic energy as claimed in claim 12, including the step of: providing hysteresis in the switching on of the second heating element.

14. The method of utilizing solar photovoltaic energy as claimed in claim 13, wherein hysteresis is provided by imposing non-zero modulated energy to the second heating element during the switching on of the second heating element.

15. The method of utilizing solar photovoltaic energy as claimed in claim 13, wherein hysteresis is provided by imposing delaying the switching of the second heating element.

16. The control system of claim 1, the controller being further configured to:
   in response to determining that current is flowing to the utility grid and the temperature is below the threshold temperature, activate the first heating element.

17. The control system of claim 1, the controller being further configured to:
   in response to determining that the temperature is greater than or equal to the maximum temperature, deactivate the first heating element and the second heating element.

\* \* \* \* \*